US012676875B2

(12) United States Patent

Prado et al.

(10) Patent No.: US 12,676,875 B2
(45) Date of Patent: Jul. 7, 2026

(54) LEVERAGING GLOBAL EXPLANATIONS ON A RESTRICTED EDGE ENVIRONMENT

(71) Applicant: Dell Products L.P., Round Rock, TX (US)

(72) Inventors: Adriana Bechara Prado, Niterói (BR); Alexander Eulalio Robles Robles, Valinhos (BR); Eduarda Tatiane Caetano Chagas, Maceió (BR); Helen Cristina de Mattos Senefonte, Londrina (BR); Jonathan Mendes De Almeida, Brasília (BR); Karen Stefany Martins, Belo Horizonte (BR)

(73) Assignee: Dell Products L.P., Round Rock, TX (US)

( * ) Notice: Subject to any disclaimer, the term of this patent is extended or adjusted under 35 U.S.C. 154(b) by 100 days.

(21) Appl. No.: 18/636,633

(22) Filed: Apr. 16, 2024

(65) Prior Publication Data

US 2025/0323926 A1     Oct. 16, 2025

(51) Int. Cl.
    *H04L 29/06*    (2006.01)
    *H04L 9/40*    (2022.01)

(52) U.S. Cl.
    CPC ................................. *H04L 63/1425* (2013.01)

(58) Field of Classification Search
    CPC .................................................. H04L 63/1425
    See application file for complete search history.

(56) References Cited

U.S. PATENT DOCUMENTS

| | | | |
|---|---|---|---|
| 11,853,853 B1* | 12/2023 | Beauchesne | ........ H04L 63/1433 |
| 2016/0021122 A1* | 1/2016 | Pevny | ................. H04L 63/1425 |
| | | | 726/23 |
| 2018/0316701 A1* | 11/2018 | Holzhauer | .......... H04L 63/1433 |
| 2022/0321585 A1* | 10/2022 | Cobb | ..................... G06N 20/00 |
| 2023/0325640 A1* | 10/2023 | Thewes | ................... G06N 3/09 |
| | | | 706/21 |
| 2025/0139246 A1* | 5/2025 | Prado | .................... G06F 21/566 |

OTHER PUBLICATIONS

Yeh et al., "Matrix Profile I: All pairs similarity joins for time series: a unifying view that includes motifs, discords and shapelets", Proc' of 16th IEEE ICDM, 2016, pp. 1317-1322.

P. Bailis, E. Gan, S. Madden, D. Narayanan, K. Rong, and S. Suri, "MacroBase: Prioritizing Attention in Fast Data." arXiv, Mar. 24, 2017. doi: 10.48550/arXiv.1603.00567.

(Continued)

*Primary Examiner* — Ka Shan Choy

(74) *Attorney, Agent, or Firm* — Workman Nydegger

(57) ABSTRACT

Techniques for classifying anomalies are disclosed. Data sets are collected. Anomalies are identified within those data sets. Explanations are generated for those anomalies. A central table is created, and this central table lists multiple conjugation of feature ranges described in the explanations. A pattern mining algorithm is applied to the central table. The pattern mining algorithm is tasked with identifying whether the second conjugation of feature ranges corresponds with the first conjugation of feature ranges. A determination is made that the second conjugation of feature ranges does correspond with the first conjugation of feature ranges. The anomalies are flagged as being global anomalies.

20 Claims, 7 Drawing Sheets

Architecture
100

(56) References Cited

OTHER PUBLICATIONS

J. Han, J. Pei, and Y. Yin. Mining frequent patterns without candidate generation. In SIGMOD, 2000.

Ribeiro, Marco Tulio, Sameer Singh, and Carlos Guestrin. "Why should i trust you?" Explaining the predictions of any classifier. Proceedings of the 22nd ACM SIGKDD international conference on knowledge discovery and data mining. 2016.

Lundberg, Scott M., and Su-In Lee. "A unified approach to interpreting model predictions." Advances in neural information processing systems 30 (2017).

V. Jacob, F. Song, A. Stiegler, B. Rad, Y. Diao, and N. Tatbul, "Exathlon: A Benchmark for Explainable Anomaly Detection over Time Series." arXiv, Sep. 5, 2021. doi: 10.48550/arXiv.2010.05073.

J. M. DeAlmeida et al., "Abnormal Behavior Detection Based on Traffic Pattern Categorization in Mobile Networks," IEEE Transactions on Network and Service Management, vol. 18, No. 4, pp. 4213-4224, Dec. 2021, doi: 10.1109/TNSM.2021.3125019.

A. Maske and B. Joglekar, "Survey on Frequent Item-Set Mining Approaches in Market Basket Analysis," in 2018 Fourth International Conference on Computing Communication Control and Automation (ICCUBEA), Aug. 2018, pp. 1-5. doi: 10.1109/ICCUBEA. 2018.8697776.

Fang, Haokun, and Quan Qian. "Privacy preserving machine learning with homomorphic encryption and federated learning." Future Internet 13.4. 2021.

Zhang, Haopeng, Yanlei Diao, and Alexandra Meliou. "Exstream: Explaining anomalies in event stream monitoring." Proceedings of the 20th international conference on extending database technology (EDBT). 2017.

* cited by examiner

Table
200

| Instance ID | Feature 1 | Feature 2 | Feature 3 | Feature 4 | Feature 5 | Feature 6 |
|---|---|---|---|---|---|---|
| 1 | | >100 | | | <= 4 | |
| 2 | >50 | | | | | |
| 3 | | >100 | | | <= 4 | |

*Figure 2*

Table
300

| Edge/Instance ID | Feature 1 | Feature 2 | Feature 3 | Feature 4 | Feature 5 | Feature 6 |
|---|---|---|---|---|---|---|
| 1/1 | | x | | | x | |
| 2/4 | x | | | | | x |
| 3/2 | | x | | | x | |

*Figure 3*

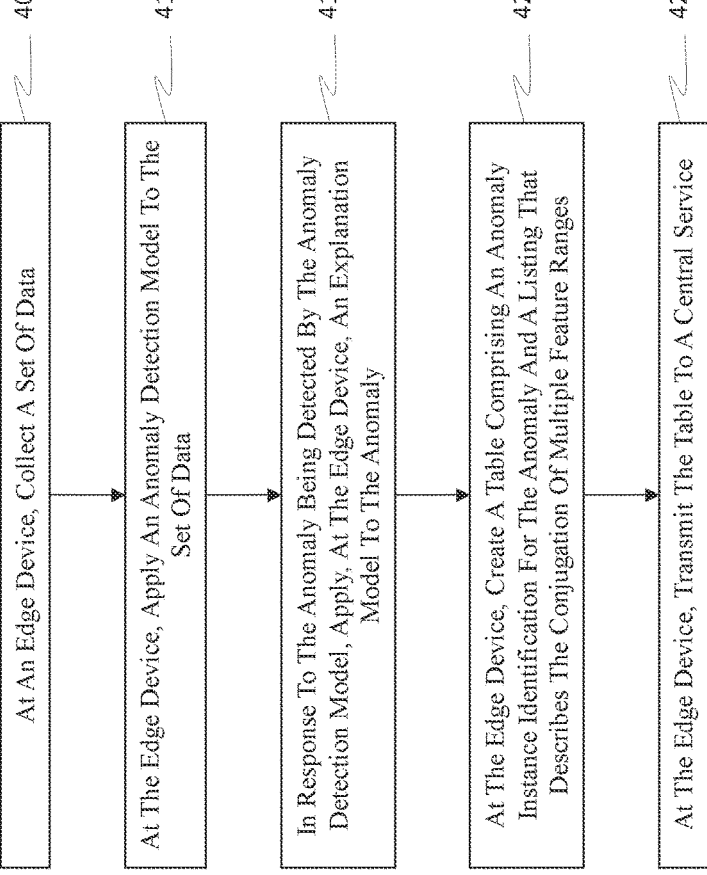

400

At An Edge Device, Collect A Set Of Data — 405

At The Edge Device, Apply An Anomaly Detection Model To The Set Of Data — 410

In Response To The Anomaly Being Detected By The Anomaly Detection Model, Apply, At The Edge Device, An Explanation Model To The Anomaly — 415

At The Edge Device, Create A Table Comprising An Anomaly Instance Identification For The Anomaly And A Listing That Describes The Conjugation Of Multiple Feature Ranges — 420

At The Edge Device, Transmit The Table To A Central Service — 425

Figure 4

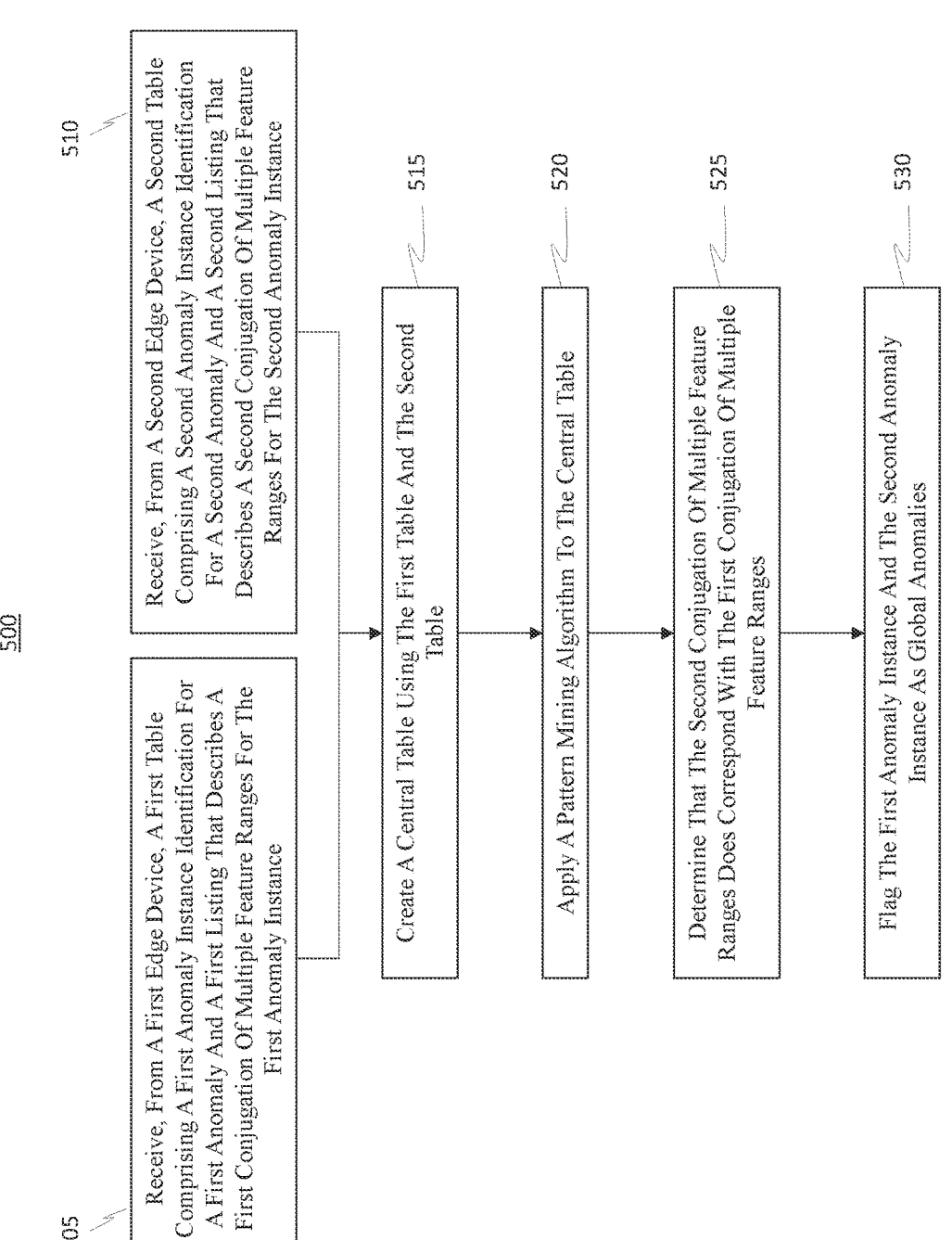

500

505

510

Receive, From A First Edge Device, A First Table Comprising A First Anomaly Instance Identification For A First Anomaly And A First Listing That Describes A First Conjugation Of Multiple Feature Ranges For The First Anomaly Instance Receive, From A Second Edge Device, A Second Table Comprising A Second Anomaly Instance Identification For A Second Anomaly And A Second Listing That Describes A Second Conjugation Of Multiple Feature Ranges For The Second Anomaly Instance

515

Create A Central Table Using The First Table And The Second Table

520

Apply A Pattern Mining Algorithm To The Central Table

525

Determine That The Second Conjugation Of Multiple Feature Ranges Does Correspond With The First Conjugation Of Multiple Feature Ranges

530

Flag The First Anomaly Instance And The Second Anomaly Instance As Global Anomalies

*Figure 5*

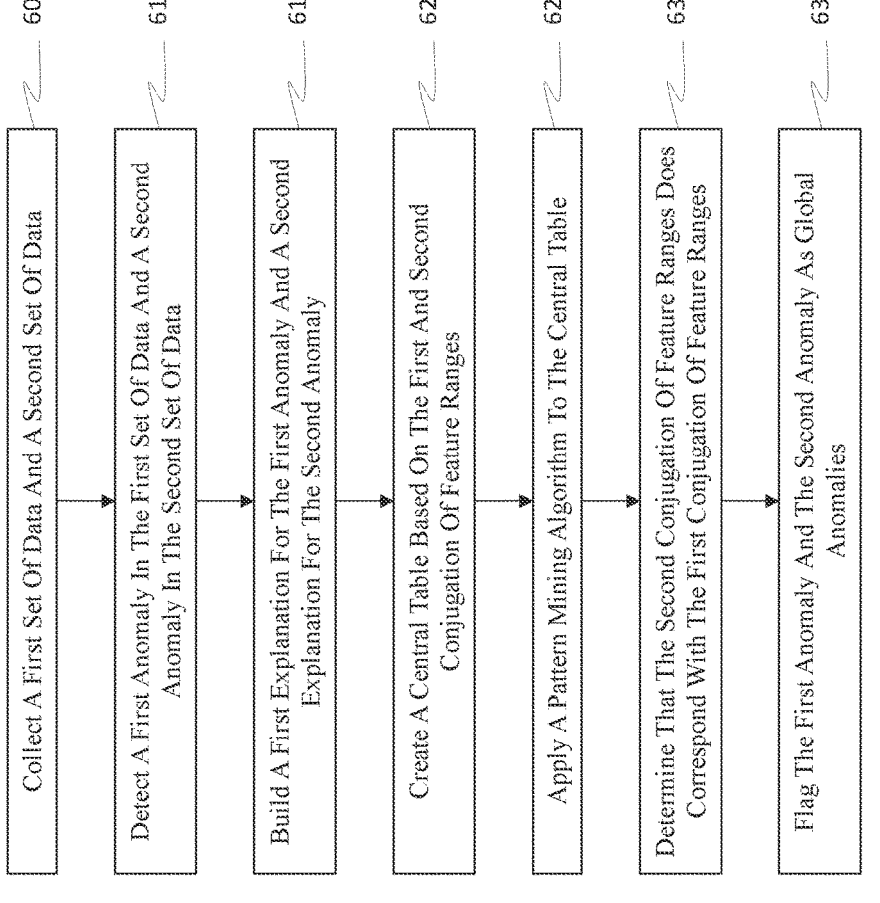

600

605 — Collect A First Set Of Data And A Second Set Of Data

610 — Detect A First Anomaly In The First Set Of Data And A Second Anomaly In The Second Set Of Data 615 — Build A First Explanation For The First Anomaly And A Second Explanation For The Second Anomaly 620 — Create A Central Table Based On The First And Second Conjugation Of Feature Ranges 625 — Apply A Pattern Mining Algorithm To The Central Table 630 — Determine That The Second Conjugation Of Feature Ranges Does Correspond With The First Conjugation Of Feature Ranges 635 — Flag The First Anomaly And The Second Anomaly As Global Anomalies

Memory
705

NVRAM
710

Processor
715

Storage Media
720

UI Device
725

Data Storage
730

Application(s)
735

LEVERAGING GLOBAL EXPLANATIONS ON A RESTRICTED EDGE ENVIRONMENT

COPYRIGHT AND MASK WORK NOTICE

TECHNOLOGICAL FIELD OF THE DISCLOSURE

Embodiments disclosed herein generally relate to categorizing anomalies. More particularly, at least some embodiments relate to systems, hardware, software, computer-readable media, and methods for identifying anomalies and for categorizing those anomalies as either local or global.

BACKGROUND

Anomaly detection (AD) refers to various techniques for identifying events that deviate from established patterns. AD is imperative to achieve a Zero Trust (ZT) ecosystem. The idea of the ZT ecosystem is to prevent everything that is different from a "known good." Considering ZT scenarios, AD systems focus on identifying abnormal events in entities' behaviors over time and generating alerts for security teams.

However, due to the possibility of an occurrence of false alerts, discovering anomalous events without any justification hinders the remediation process. In other words, the AD technique should explain why, in terms of the characteristics of the time series in question, certain events were classified as normal or abnormal. In this context, explainable artificial intelligence (XAI) techniques are beneficial to identifying whether an event is a true anomaly and to take actions to remediate that event.

BRIEF DESCRIPTION OF THE DRAWINGS

In order to describe the manner in which at least some of the advantages and features of one or more embodiments may be obtained, a more particular description of embodiments will be rendered by reference to specific embodiments thereof which are illustrated in the appended drawings. Understanding that these drawings depict only typical embodiments and are not therefore to be considered to be limiting of the scope of this disclosure, embodiments will be described and explained with additional specificity and detail through the use of the accompanying drawings.

FIG. 2 illustrates an example table created by an edge device.

FIG. 3 illustrates an example table created by a central service.

FIG. 4 illustrates a flowchart of an example method for identifying anomalies.

FIG. 5 illustrates a flowchart of an example method for categorizing anomalies as either local or global.

FIG. 6 illustrates a flowchart of an example method for categorizing anomalies.

DETAILED DESCRIPTION

Figure 1:
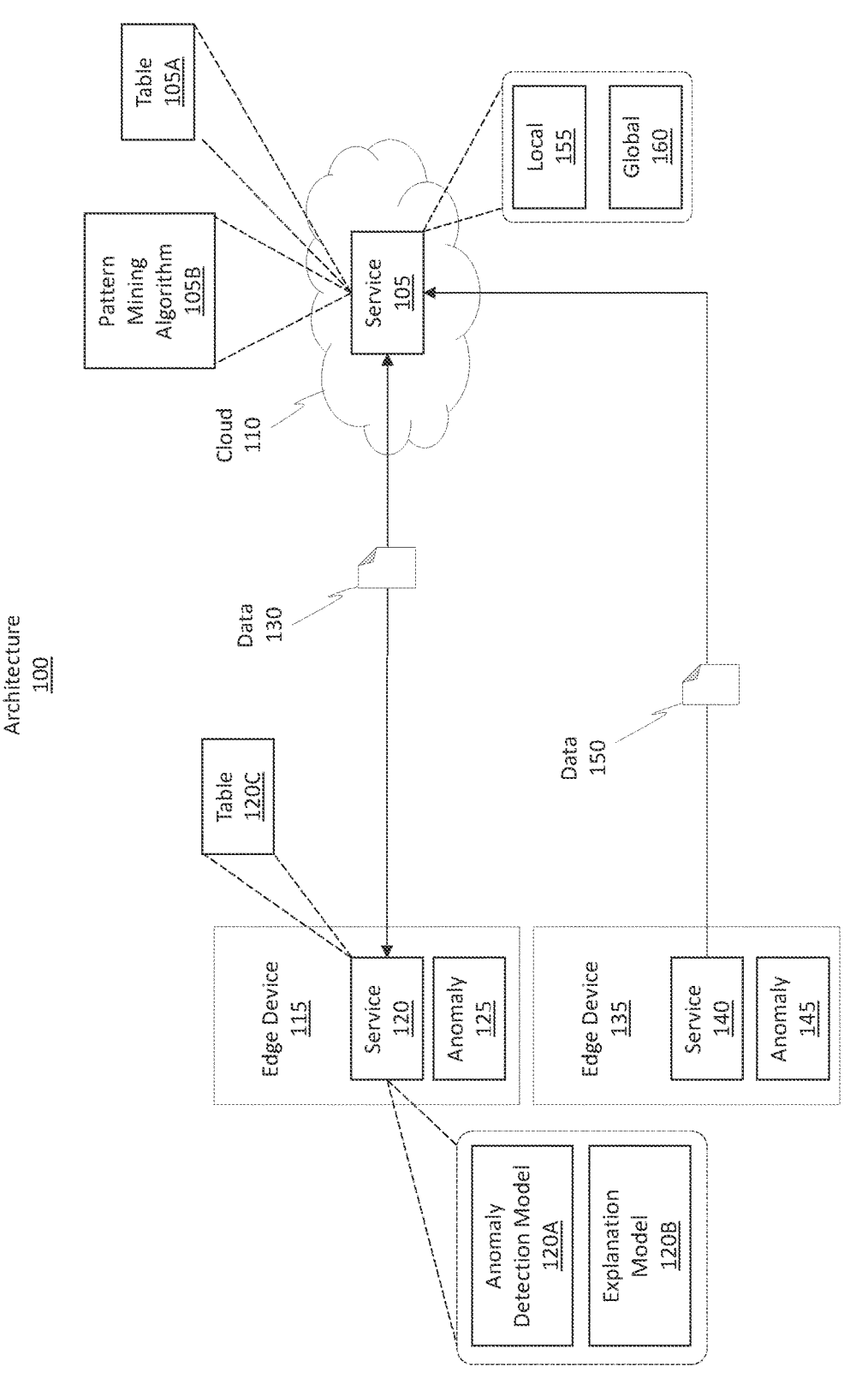
FIG. 1 illustrates an example computing architecture for identifying anomalies and for categorizing those anomalies as either local or global.

Considering an edge environment, where devices are often initialized with one unique anomaly detection model, it is beneficial to keep the model updated to deal with new domains. However, if the model operates in a distributed environment with strong privacy and security constraints, such as in federated learning use cases, it is difficult to traffic data instances due to security policies. Consequently, it is beneficial to locally update the model.

Even if the environment is not highly restricted, sharing data between edge devices can be very computationally costly and can impede some edge device use cases. In these scenarios, analyzing anomalies from each edge device individually can require many hours of expert time, turning the review process into an unpractical and/or unfeasible task.

Furthermore, it is worthwhile to discern whether the abnormal behavior is a local phenomenon or a global phenomenon. A local anomaly occurs only at a specific edge node. A global anomaly, on the other hand, can occur in multiple edge nodes. Besides identifying anomalies, generating explanations for both local and global anomaly types can help administrators to understand the anomalies' root causes and can help guide perceiving frequent patterns and malicious attacks, both locally and globally. What is needed, therefore, is an improved technique for defining strategies to allow local and global anomaly analysis in edge environments.

The disclosed embodiments provide numerous benefits, advantages, improvements, and practical applications to the field of anomaly detection and classification. In particular, the embodiments address the above problems by 1) applying an anomaly detection model and an explanation algorithm in each edge to understand when an anomaly occurs (e.g., feature X>100 and feature Y<=4) and 2) sharing the anomaly feature-range to a central server, which then distinguishes between local and global anomalies.

As indicated above, the embodiments share only the feature ranges with the central server. Those feature ranges can optionally be anonymized using encryption techniques (e.g., such as homomorphic encryption). By sharing only the feature ranges, the embodiments advantageously ensure data privacy by avoiding the traffic of data instances. The embodiments also beneficially reduce the amount of data the edge node has to transmit.

As an additional benefit, the embodiments are able to provide unique techniques to generate local and global explanations in edge environments. Doing so enables a better understanding of a root cause for an anomaly. For instance, the derived root cause can be used as a security mechanism to identify whether a malicious attack is occurring only in a specific edge or if the attack is a global problem. This differentiation can be used to provide enhanced assistance when mitigating the attack.

As another benefit, the embodiments provides a secure mechanism that avoids massive data sharing between edge nodes. The explanation(s) for an anomaly are generated inside the edge device. Subsequently, only a small subset of encrypted data (e.g., the explanation, not the data itself) is shared to the central server to compare the explanations. Performing these operations reduces the overall cost and potential vulnerabilities with respect to hacking client data.

Accordingly, these and numerous other benefits will now be described in more detail throughout the remaining portions of this disclosure.

Example Architectures

Having just described some of the high-level benefits, advantages, and practical applications provided by the disclosed embodiments, attention will now be directed to FIG. 1, which illustrates an example architecture 100 in which the disclosed principles may be employed. Architecture 100 shows a service 105.

As used herein, the term "service" refers to an automated program that is tasked with performing different actions based on input. In some cases, service 105 can be a deterministic service that operates fully given a set of inputs and without a randomization factor. In other cases, service 105 can be or can include a machine learning (ML) or artificial intelligence engine. The ML engine enables service 105 to operate even when faced with a randomization factor.

As used herein, reference to any type of machine learning or artificial intelligence may include any type of machine learning algorithm or device, convolutional neural network (s), multilayer neural network(s), recursive neural network (s), deep neural network(s), decision tree model(s) (e.g., decision trees, random forests, and gradient boosted trees) linear regression model(s), logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

Service 105 is shown as residing in a cloud 110 environment. Architecture 100 further includes an edge device 115 that includes a service 120. The above general descriptions for service 105 can also apply to service 120.

Service 120 is generally tasked with collecting a data set and identifying an anomaly 125 within that data set. Service 120 then provides an explanation for that anomaly. This explanation is then transmitted to service 105, as shown by the transmitted data 130. Optionally, the data 130 can be encrypted.

FIG. 1 further shows another edge device 135 with a corresponding service 140, which can be configured as above. Service 140 also collects data, identifies anomalies (e.g., anomaly 145), and provides explanations for those anomalies. This explanation is then transmitted to service 105, as shown by the transmitted data 150. Data 130 and 150 do not include the data that was collected; rather, the data 130 and 150 include only conjugations of feature ranges obtained from the explanations.

Service 105 is tasked with aggregating the data 130 and 150, as well as any other data received from any other edge devices. Service 105 then classifies the anomalies (based on the aggregated conjugations of feature ranges) as either local anomalies (e.g., local 155) or global anomalies (e.g., global 160). Further details are provided below.

At a high level, the disclosed services address the following problems: (i) how to generate local and global anomaly explanations in edge environments and (ii) how to avoid massive data sharing between edges. The embodiments are beneficially structured to generate local and global explanations in edge environments. The embodiments also distinguish between local and global explanations as a means to understand the root causes of the anomalies that may occur in edge environments. For instance, it can be helpful to perceive if a malicious attack is occurring only in a specific edge, or if it is a global problem, giving assistance to mitigate the attack.

The embodiments are unique as to how they avoid massive data sharing between edge devices and how they maintain security. One sub-optimal way to generate local and global explanations would be to create a central server that receives raw data from all edge devices and that applies XAI techniques. Such a technique, however, is very computationally expensive and has security vulnerabilities.

In the disclosed approach, the explanations are generated at an edge device. That edge device then transmits only a limited amount of information to the central server. This limited amount of information includes only the explanations for the anomalies and not the data in which the anomaly is found. By transmitting only this limited amount of information, the embodiments are able to significantly reduce cost and susceptance to hacking and other vulnerabilities.

The embodiments are directed to a novel pipeline that generates local and global explanations in edge environments. As one example, consider a scenario where an initial model is created in a central server (e.g., service 105) and then distributed to all edge devices (e.g., edge device 115 and edge device 135). In the edge device, the model (e.g., service 120 and service 140) can now be uniquely adapted to a new and local domain.

The disclosed principles are primarily divided into two phases, which are described in detail below. This example will primarily focus on the operations performed by edge device 115. One will appreciate, however, how similar operations can be performed by edge device 135.

Phase one involves a service at the edge device (e.g., service 120 at edge device 115) collecting data and then detecting an anomaly 125 within the collected data. To illustrate, service 120 collects a dataset. Service 120 then applies an anomaly detection model 120A to detect an anomaly within the collected dataset.

For each anomaly instance (or range), service 120 then applies an explanation model 120B. This explanation model 120B builds explanations as conjunctions of feature ranges (e.g., anomaly feature 2>100 and anomaly feature 5<=4). If there is more than one anomaly instance with the same explanation, service 120 filters the instances so that only one instance per explanation is made available.

Service 120 then creates an instance identification (ID) and features table, as shown by table 120C. In table 120C, each row represents an instance ID, and each column represents a feature of an anomaly. For instance, table 200 of FIG. 2 is illustrative of table 120C from FIG. 1. Notice, table 200 includes an instance ID for each detected anomaly. Table 200 also lists a conjugation of multiple different features for that detected anomaly. To illustrate, consider instance ID 1 of a first anomaly. This instance includes the following conjugation of features: Feature 2>100 and Feature 5<=4.

Returning to FIG. 1, for each instance in table 120C, service 120 adds encryption (e.g., perhaps a homomorphic encryption) to the maximum and minimum values for that instance's features. Service 120 then sends the table 120C (as shown by data 130) to service 105. Thus, phase one is performed by service 120 of the edge device 115. Phase one is also performed by service 140 of edge device 135.

Phase two involves generating global and local explanations, or rather, involves classifying anomalies as either global anomalies or local anomalies. To do so, service 105 receives tables from multiple edge devices, as shown by received data 130 and 150. Service 105 then creates an edge instance ID and features table, as shown by table 105A.

Each row in table 105A represents a combination of an edge and instance ID. Each column in table 105A represents a feature. Table 300 of FIG. 3 is illustrative.

For instance, table 300 includes an edge ID and an instance ID (e.g., consider the row with the label 1/1). For line item 1/1, there is a conjugation of feature 2 and feature 5. For line item 2/4, there is a conjugation of feature 1 and feature 6. For line item 3/2 2, there is another conjugation of feature 2 and feature 5, similar to line item 1/1.

For each edge and instance combination (i.e. line item), service 105 of FIG. 1 marks the relevant features (e.g., FIGS. 2 and 5 for line item 1/1 in FIG. 3). Service 105 then applies a pattern mining algorithm 105B (e.g., FPGrowth) to generate frequent item sets from the table 105A. For instance, line items 1/1 and 3/2 can be viewed as being frequent item sets because the conjugation of features 2 and 5 appear multiple times in table 300. Service 105 then selects the top k item sets (e.g., higher support).

For each itemset, service 105 selects the instances that contain all relevant features in the itemset. For each feature, service 105 finds an intersection between the edge's ranges (i.e., a maximum and minimum value in common for all instances). If the intersection is not null and if all instances are from the same edge, the anomaly is local. Otherwise, the anomaly is a global anomaly. Line item 2/4 in FIG. 3 will be classified as a local anomaly while line items 1/1 and 3/2 will be classified as global anomalies.

Service 105 can also select the m worst item sets (e.g., lower support). For each of those item sets, service 105 selects the instances that contain all the relevant features in the itemset. If all instances are from the same edge, the anomaly is local. Service 105 generates an alert for edge devices that were not identified in the previous step. These devices may be benefitted from further analysis because they differ from the majority. With reference to table 300, according to the above procedures, line items 1/1 and 3/2 will be classified as a global anomaly while line item 2/4 will be classified as a local anomaly.

Additional Details

Relevant XAI techniques generally belong to two broad families: model-agnostic methods and interpretable models. Model-agnostic methods separate explanations from the Machine Learning (ML) model and provide feature-based explanations, generally based on data perturbation. More specifically, the explanations are provided in terms of feature importance scores that indicate how much each feature contributes to the model's prediction.

Conversely, interpretable models, such as generalized linear models, generate trackable information regarding how the model achieves a particular result (e.g., trained parameters of a Poisson regression). However, in this case, the full comprehension of explanations is restricted to specialists able to understand, for example, the parameters of a regression or the outlier score value computed by the model (e.g., distances computed by matrix profile, reconstruction error computed by Autoencoder solutions, and energy computed by quantum mechanics approaches). The disclosed embodiments focus on model-agnostic methods capable of building explanations as conjunctions of feature-ranges (e.g., feature $X>100$ and feature $Y<=4$).

Frequent pattern mining and association rules are data mining techniques that are used to automatically identify patterns and relationships between variables occurring in a dataset. Together, they are particularly useful techniques that can extract patterns and relationships in large datasets, which are humanly impossible to extract based solely on visual analysis of the raw data or outlier scores computed by AD techniques. Frequent pattern mining algorithms aim at finding items or item sets that occur together regularly and can be done using, for example, the FPGrowth algorithm.

The disclosed embodiments provide a solution to distinguish between a local anomaly (i.e., an anomaly that occurs only in a specific edge node) and a global anomaly (i.e., an anomaly that can occur in multiple edge nodes), where this technique leverages root cause understanding. The solution is divided into two phases, as introduced earlier. In phase 1, the embodiments detect an anomaly in an edge device and send that anomaly's explanations to a central service. Then, in phase 2, the embodiments generate local and global explanations based on a combination of anomalies from multiple edges.

As generally mentioned earlier, the first phase is responsible for executing an anomaly detection (AD) and an explanation algorithm in each edge device. The embodiments start collecting a time series containing a set of F features and a set of T timestamps. Next, the embodiments apply a previously trained AD algorithm capable of distinguishing anomalous and non-anomalous ranges. It is worthwhile to notice that an anomaly instance can be a unique timestamp or a continuous range of timestamps. Then, for each anomaly instance, the embodiments apply an explanation method to generate an explanation as a conjunction of multiple feature-ranges (e.g., feature $X>100$ and feature $Y<=4$).

After generating the explanations for each anomaly, the embodiments create an instance ID and features table, where each row represents an anomaly instance ID, and each column represents a feature in F. For each instance, the embodiments add its important features' maximum and minimum values in the corresponding column. If there are more than one anomaly instance with the same explanation, the embodiments filter only one instance per explanation. Table 200 of FIG. 2 shows an example of the table. In this case, since instance IDs 1 and 3 have the same explanation, instance ID 3 can be filtered from the table. The embodiments can also encrypt the table (e.g., homomorphic encryption) and send it to the central service 105.

Phase 2 involves generating global and local explanations. The second phase is responsible for identifying if the edges' anomalies are local or global. The central service 105 receives the tables created in phase 1 from all edge devices. Service 105 aggregates the tables, thereby creating a single edge instance ID and features table, where each row represents a combination of edge and instance IDs, and each column represents a feature in F. For each edge and instance combination, the embodiments mark its relevant features. For instance, in table 300 of FIG. 3, features 2 and 5 are relevant to line items 1/1 and 3/2, and features 1 and 6 are relevant to line item 2/4.

The embodiments apply a pattern mining algorithm to the edge instance ID and features table to generate frequent item sets and select the top k item sets according to a predefined metric (e.g., higher support). Considering table 300, an itemset with features 2 and 5 would have the highest support. For each itemset in k, the embodiments select the instances that contain all relevant features in the itemset (e.g., in this example, line items 1/1 and 3/2).

Then, the embodiments find an intersection between the ranges of the multiple edges (i.e., a maximum and minimum value in common for all instances). For instance, if instance ID 1/1 has the range feature 2>=100 and feature 5<=4, and instance ID 3/2 has the range feature 2>=50 and feature 5<=2, the intersection would be feature 2>=100 and feature 5<=2.

If there is at least one intersection between two or more instances, it is considered a global anomaly. Otherwise, if there is no intersection between instances, each one is a local anomaly. It is worthwhile to notice that the intersection does not need to occur in all instances together. That is, it is possible to have different intersections for subsets of instances.

The embodiments select the m worst item sets according to a predefined metric (e.g., lower support). For each itemset in m, the embodiments select the instances that contain all relevant features in the itemset. If all instances are from the same edge, the anomaly is local. Otherwise, the embodiments apply the intersection again to generate global explanations. The embodiments can also generate an alert for edge devices that were not identified as a local or global anomaly. Since they differ from the majority, further analysis might be warranted.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Attention will now be directed to FIG. 4, which illustrates a flowchart of an example method 400 for identifying and explaining anomalies at an edge device. Method 400 can be implemented within architecture 100 of FIG. 1. Furthermore, method 400 can be performed by either service 120 or service 140.

Method 400 includes an act (act 405) of collecting, at an edge device, a set of data. The edge device may be one edge device among a plurality of edge devices that communicate with a central service.

At the edge device, act 410 includes applying an anomaly detection model to the set of data. The anomaly detection model is tasked with analyzing the set of data to detect an anomaly.

In response to the anomaly being detected by the anomaly detection model, act 415 includes applying, at the edge device, an explanation model to the anomaly. The explanation model is tasked with building an explanation for the anomaly, where the explanation includes at least one feature range, though it may include a conjugation of multiple feature ranges.

At the edge device, act 420 includes creating a table comprising an anomaly instance identification for the anomaly. The table also includes a listing that describes the conjugation of multiple feature ranges.

Act 425 then includes transmitting, at the edge device, the table to a central service. Optionally, the table can be encrypted prior to being transmitted to the central service. In an effort to reduce the amount of data that is transmitted by the edge device, the table omits data obtained from the set of data and instead includes the multiple feature ranges.

In some implementations, method 400 may further include identifying an anomaly instance having a same explanation as the original anomaly. The embodiments can then filter the anomaly instance so that the anomaly instance is omitted from the table. This filtering is performed to remove redundant data.

FIG. 5 shows an example method 500 for determining whether an anomaly is a local anomaly or a global anomaly. Method 500 can be implemented within architecture 100 of FIG. 1. Furthermore, method 500 can be performed by service 105.

Method 500 includes an act 505 of receiving, from a first edge device, a first table. This first table includes a first anomaly instance identification for a first anomaly and a first listing that describes a first conjugation of multiple feature ranges for the first anomaly instance. The table can include many instances; however, their explanations will be different. Thus, there is one instance per type of explanation in the table.

Act 510 includes receiving, from a second edge device, a second table. This second table includes a second anomaly instance identification for a second anomaly and a second listing that describes a second conjugation of multiple feature ranges for the second anomaly instance.

Act 515 includes creating a central table using the first table and the second table. In some implementations, each row in the central table represents a combination of an edge and anomaly instance identification. Each column in the central table represents a detected feature of a corresponding anomaly.

Act 520 includes applying a pattern mining algorithm to the central table. The pattern mining algorithm is tasked with identifying whether the second conjugation of multiple feature ranges corresponds with the first conjugation of multiple feature ranges.

Act 525 includes determining that the second conjugation of multiple feature ranges does correspond with the first conjugation of multiple feature ranges. Act 530 then includes flagging the first anomaly instance and the second anomaly instance as global anomalies. In fact, these two anomalies correspond to the same anomaly, which is occurring at both of the edge devices.

In some cases, method 500 includes various other acts. For instance, another act includes receiving, from a third edge device, a third table comprising a third anomaly instance identification for a third anomaly and a third listing that describes a third conjugation of multiple feature ranges for the third anomaly instance. Another act involves including the third table in the central table. The embodiments then apply the pattern mining algorithm to the central table. The embodiments also determine that the third conjugation of multiple feature ranges does not correspond with the first or second conjugation of multiple feature ranges. The embodiments then flag the third anomaly instance as a local anomaly. In this regard, some embodiments may determine that a third anomaly instance is a local anomaly. Optionally, the embodiments can notify the first and second edge devices of the global anomalies.

FIG. 6 shows a flowchart of an example method 600 for performing phase one and phase two mentioned earlier. Method 600 can be performed by service 120 and/or 140 and service 105.

Act 605 includes collecting a first set of data and a second set of data. For instance, service 120 collects a first data set, and service 140 collects a second data set.

Act 610 includes detecting a first anomaly in the first set of data and a second anomaly in the second set of data. For instance, service 120 detects a first anomaly 125, and service 140 detects a second anomaly 145. The anomalies may be detected using an anomaly detection model.

Act 615 includes building a first explanation for the first anomaly and a second explanation for the second anomaly. For instance, service 120 builds a first table (e.g., table 120C) comprising explanations, and service 140 builds a second data comprising explanations. The first explanation includes a first conjugation of feature ranges, and the second explanation includes a second conjugation of feature ranges. Optionally, the first and second conjugation of feature ranges are encrypted. The explanations may be built using an explanation model.

Act 620 includes creating a central table based on the first and second conjugation of feature ranges. For example, service 105 creates the table 105A.

Act 625 includes applying a pattern mining algorithm to the central table. The pattern mining algorithm is tasked with identifying whether the second conjugation of feature ranges corresponds (e.g., matches) with the first conjugation of feature ranges.

Act 630 includes determining that the second conjugation of feature ranges does correspond with the first conjugation of feature ranges. For instance, table 300 of FIG. 3 shows how line item 1/1 corresponds with line item 3/2. Thus, the first anomaly and the second anomaly correspond to the same anomaly, which is occurring on multiple different edge devices.

Act 635 includes flagging the first anomaly and the second anomaly as global anomalies. In some cases, method 600 includes another act comprising a determination that a third anomaly recorded in the central table is a local anomaly.

Example Computer Systems

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. Also, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, client, engine, agent, services, and component are examples of terms that may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 7:
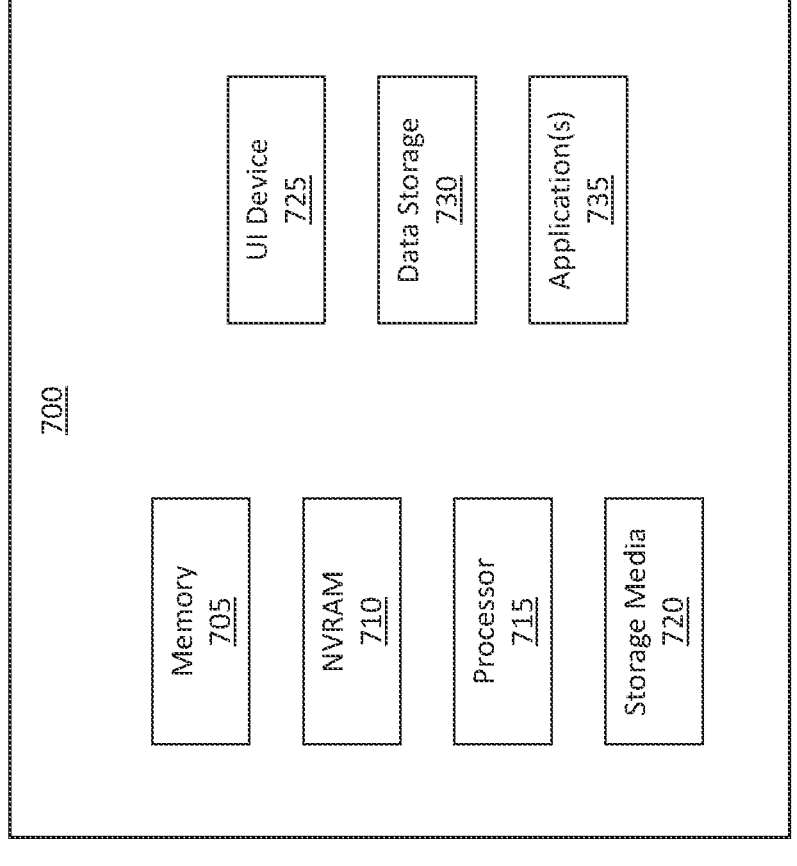
FIG. 7 illustrates an example computer system that can be configured to perform any of the disclosed operations.

With reference briefly now to FIG. 7, any one or more of the entities disclosed, or implied, by the Figures and/or elsewhere herein, may take the form of, or include, or be implemented on, or hosted by, a physical computing device, one example of which is denoted at 700. Also, where any of the aforementioned elements comprise or consist of a virtual machine (VM), that VM may constitute a virtualization of any combination of the physical components disclosed in FIG. 7. Device 700 can implement the architecture 100 of FIG. 1.

In the example of FIG. 7, the physical computing device 700 includes a memory 705 which may include one, some, or all, of random access memory (RAM), non-volatile memory (NVM) 710 such as NVRAM for example, read-only memory (ROM), and persistent memory, one or more hardware processors 715, non-transitory storage media 720, UI device 725, and data storage 730. One or more of the memory 705 of the physical computing device 700 may take the form of solid-state device (SSD) storage. Also, one or more applications 735 may be provided that comprise instructions executable by one or more hardware processors 715 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein. The physical device 700 may also be representative of an edge system, a cloud-based system, a datacenter or portion thereof, or other system or entity.

The disclosed embodiments can be implemented in numerous different ways, as described in the various different clauses recited below.

Clause 1. A method comprising: at an edge device, collecting a set of data; at the edge device, applying an anomaly detection model to the set of data, wherein the anomaly detection model is tasked with analyzing the set of data to detect an anomaly; in response to the anomaly being detected by the anomaly detection model, applying, at the edge device, an explanation model to the anomaly, wherein the explanation model is tasked with building an explanation for the anomaly, where the explanation includes a conjugation of multiple feature ranges; at the edge device, creating a table comprising an anomaly instance identification for the anomaly and a listing that describes the conjugation of multiple feature ranges; and at the edge device, transmitting the table to a central service.

Clause 2. The method of any of the preceding clauses, wherein the table is encrypted prior to being transmitted to the central service.

Clause 3. The method of any of the preceding clauses, wherein the table omits data obtained from the set of data and instead includes the multiple feature ranges.

Clause 4. The method of any of the preceding clauses, wherein the method further includes: identifying an anomaly instance having a same explanation as said anomaly; and filtering the anomaly instance so that the anomaly instance is omitted from the table.

Clause 5. The method of any of the preceding clauses, wherein the edge device is one edge device among a plurality of edge devices that communicate with the central service.

Clause 6. A method comprising: receiving, from a first edge device, a first table comprising a first anomaly instance identification for a first anomaly and a first listing that describes a first conjugation of multiple feature ranges for the first anomaly instance; receiving, from a second edge device, a second table comprising a second anomaly instance identification for a second anomaly and a second listing that describes a second conjugation of multiple feature ranges for the second anomaly instance; creating a central table using the first table and the second table; applying a pattern mining algorithm to the central table, wherein the pattern mining algorithm is tasked with identifying whether the second conjugation of multiple feature ranges corresponds with the first conjugation of multiple feature ranges; determining that the second conjugation of multiple feature ranges does correspond with the first conjugation of multiple feature ranges; and flagging the first anomaly instance and the second anomaly instance as global anomalies.

Clause 7. The method of any of the preceding clauses, wherein the method further includes: receiving, from a third edge device, a third table comprising a third anomaly instance identification for a third anomaly and a third listing that describes a third conjugation of multiple feature ranges for the third anomaly instance; including the third table in the central table; applying the pattern mining algorithm to the central table; determining that the third conjugation of multiple feature ranges does not correspond with the first conjugation of multiple feature ranges; and flagging the third anomaly instance as a local anomaly.

Clause 8. The method of any of the preceding clauses, wherein the method further includes determining that a third anomaly instance is a local anomaly.

Clause 9. The method of any of the preceding clauses, wherein the method further includes notifying the first and second edge devices of the global anomalies.

Clause 10. The method of any of the preceding clauses, wherein each row in the central table represents a combination of an edge and anomaly instance identification, and wherein each column in the central table represents a detected feature of a corresponding anomaly.

Clause 11. A method comprising: collecting a first set of data and a second set of data; detecting a first anomaly in the first set of data and a second anomaly in the second set of data; building a first explanation for the first anomaly and a second explanation for the second anomaly, wherein the first explanation includes a first conjugation of feature ranges and the second explanation includes a second conjugation of feature ranges; creating a central table based on the first and second conjugation of feature ranges; applying a pattern mining algorithm to the central table, wherein the pattern mining algorithm is tasked with identifying whether the second conjugation of feature ranges corresponds with the first conjugation of feature ranges; determining that the second conjugation of feature ranges does correspond with the first conjugation of feature ranges; and flagging the first anomaly and the second anomaly as global anomalies.

Clause 12. The method of any of the preceding clauses, wherein the first and second conjugation of feature ranges are encrypted.

Clause 13. The method of any of the preceding clauses, wherein the method further includes determining that a third anomaly recorded in the central table is a local anomaly.

Clause 14. The method of any of the preceding clauses, wherein each row in the central table represents a combination of an edge and anomaly instance identification.

Clause 15. The method of any of the preceding clauses, wherein each column in the central table represents a detected feature of a corresponding anomaly.

Clause 16. The method of any of the preceding clauses, wherein the first explanation is built using an explanation model.

Clause 17. The method of any of the preceding clauses, wherein the second explanation is built using an explanation model.

Clause 18. The method of any of the preceding clauses, wherein the first anomaly is detected using an anomaly detection model.

Clause 19. The method of any of the preceding clauses, wherein the second anomaly is detected using an anomaly detection model.

Clause 20. The method of any of the preceding clauses, wherein the first anomaly and the second anomaly correspond to a same anomaly.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:

at an edge device, collecting a set of data;

at the edge device, applying an anomaly detection model to the set of data, wherein the anomaly detection model is tasked with analyzing the set of data to detect an anomaly;

in response to the anomaly being detected by the anomaly detection model, applying, at the edge device, an explanation model to the anomaly, wherein the explanation model is tasked with building an explanation for the anomaly, where the explanation includes a conjugation of multiple feature range thresholds comprising a minimum value and a maximum value for each feature;

at the edge device, creating a table comprising an anomaly instance identification for the anomaly and a listing that describes the conjugation of multiple feature range thresholds, wherein creating the table includes filtering additional anomaly instances having a same conjugation of feature-range thresholds so that only a single representative instance is included in the table; and at the edge device, transmitting the table to a central service, wherein transmitting the table includes homomorphically encrypting the minimum and maximum values of the feature-range thresholds prior to transmission so that raw data values are not transmitted.

2. The method of claim 1, wherein the table is encrypted prior to being transmitted to the central service.

3. The method of claim 1, wherein the table omits data obtained from the set of data and instead includes the multiple feature ranges.

4. The method of claim 1, wherein the method further includes:

identifying an anomaly instance having a same explanation as said anomaly; and filtering the anomaly instance so that the anomaly instance is omitted from the table.

5. The method of claim 1, wherein the edge device is one edge device among a plurality of edge devices that communicate with the central service.

6. A method comprising:

receiving, from a first edge device, a first table comprising a first anomaly instance identification for a first anomaly and a first listing that describes a first conjugation of multiple feature ranges comprising homomorphically encrypted minimum and maximum feature-range values;

receiving, from a second edge device, a second table comprising a second anomaly instance identification for a second anomaly and a second listing that describes a second conjugation of multiple feature ranges comprising homomorphically encrypted minimum and maximum feature-range values;

creating a central table using the first table and the second table, wherein each row in the central table represents a combination of an edge and anomaly instance identification and each column in the central table represents a feature-range threshold;

applying a pattern mining algorithm comprising an itemset mining algorithm to the central table, wherein the pattern mining algorithm is tasked with identifying whether the second of multiple feature ranges corresponds with the first conjugation of multiple feature ranges;

computing, for each feature appearing in both the first and second conjugation, an intersection of the homomorphically encrypted minimum and maximum values to determine whether the feature-range thresholds overlap across the edge devices;

determining that the second conjugation of multiple feature ranges does correspond with the first conjugation of multiple feature ranges based on determining that the computed intersection is non-empty; and flagging the first anomaly instance and the second anomaly instance as global anomalies.

7. The method of claim 6, wherein the method further includes:

receiving, from a third edge device, a third table comprising a third anomaly instance identification for a third anomaly and a third listing that describes a third conjugation of multiple feature ranges for the third anomaly instance;

including the third table in the central table;

applying the pattern mining algorithm to the central table;

determining that the third conjugation of multiple feature ranges does not correspond with the first conjugation of multiple feature ranges; and flagging the third anomaly instance as a local anomaly.

8. The method of claim 6, wherein the method further includes determining that a third anomaly instance is a local anomaly.

9. The method of claim 6, wherein the method further includes notifying the first and second edge devices of the global anomalies.

10. The method of claim 6, wherein each row in the central table represents a combination of an edge and anomaly instance identification, and wherein each column in the central table represents a detected feature of a corresponding anomaly.

11. A method comprising:

collecting a first set of data and a second set of data at respective edge devices;

detecting a first anomaly in the first set of data and a second anomaly in the second set of data;

building a first explanation for the first anomaly and a second explanation for the second anomaly, wherein the first explanation includes a first conjugation of feature ranges, and the second explanation includes a second conjugation of feature ranges, wherein building each explanation includes generating minimum and maximum values for each relevant feature and filtering additional anomaly instances having identical conjugation of feature range thresholds;

creating a central table based on the first and second conjugation of feature ranges, each conjugation including homomorphically encrypted minimum and maximum values;

applying a pattern mining algorithm comprising an itemset mining algorithm to the central table, wherein the pattern mining algorithm is tasked with identifying whether the second conjugation of feature ranges corresponds with the first conjugation of feature ranges;

computing intersections of the homomorphically encrypted feature-range thresholds to determine whether the feature-range thresholds overlap across the edge devices;

determining that the second conjugation of feature ranges does correspond with the first conjugation of feature ranges when the computed intersections are non-empty; and flagging the first anomaly and the second anomaly as global anomalies.

12. The method of claim 11, wherein the first and second conjugation of feature ranges are encrypted.

13. The method of claim 11, wherein the method further includes determining that a third anomaly recorded in the central table is a local anomaly.

14. The method of claim 11, wherein each row in the central table represents a combination of an edge and anomaly instance identification.

15. The method of claim 11, wherein each column in the central table represents a detected feature of a corresponding anomaly.

16. The method of claim 11, wherein the first explanation is built using an explanation model.

17. The method of claim 11, wherein the second explanation is built using an explanation model.

18. The method of claim 11, wherein the first anomaly is detected using an anomaly detection model.

19. The method of claim 11, wherein the second anomaly is detected using an anomaly detection model.

20. The method of claim 11, wherein the first anomaly and the second anomaly correspond to a same anomaly.

* * * * *